(No Model.)

C. A. RICE.
GASOLINE TANK.

No. 426,740. Patented Apr. 29, 1890.

WITNESSES:

INVENTOR:
Chas. A. Rice
BY Munn & Co.
ATTORNEYS.

UNITED STATES PATENT OFFICE.

CHARLES A. RICE, OF PHILADELPHIA, PENNSYLVANIA.

GASOLINE-TANK.

SPECIFICATION forming part of Letters Patent No. 426,740, dated April 29, 1890.

Application filed September 30, 1889. Serial No. 325,529. (No model.)

*To all whom it may concern:*

Be it known that I, CHARLES A. RICE, of Philadelphia, in the county of Philadelphia and State of Pennsylvania, have invented a new and useful Improvement in Gasoline-Tanks, of which the following is a full, clear, and exact description.

My invention relates to an improvement in gasoline-tanks especially adapted for use as a supply-tank for gasoline-stoves, and has for its object to provide a tank so constructed as to effectually prevent leakage, and wherein, when the storage-section of the tank is removed from its shell or casing for purposes of recharging, valves will automatically operate to stop the flow of any liquid remaining in the said storage-section.

A further object of the invention is to so construct the tank that when the storage-section has been filled and placed in operation within its shell or casing the valves will be automatically operated to establish communication between the storage-chamber and the feed-pipe of the stove.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
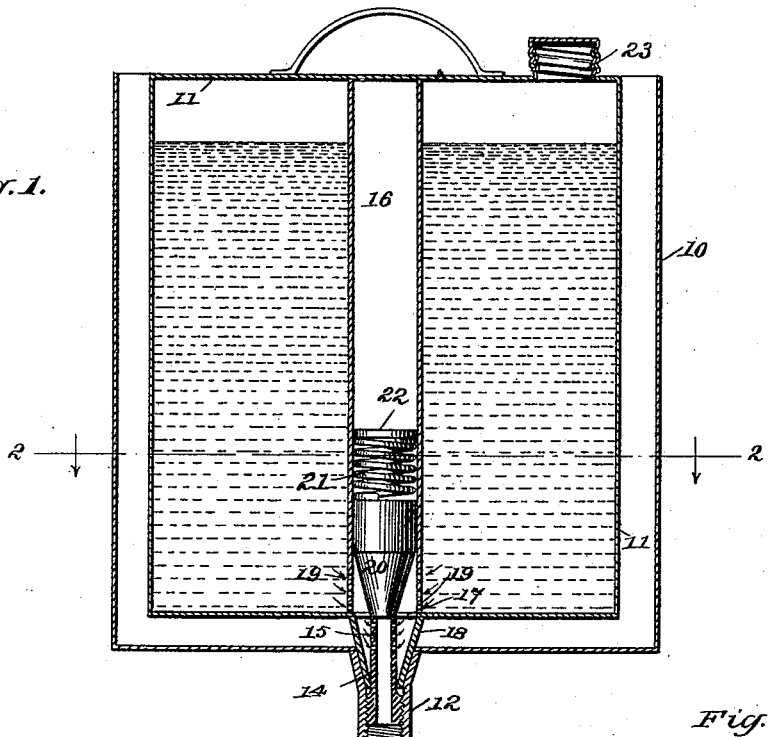
Figure 2:
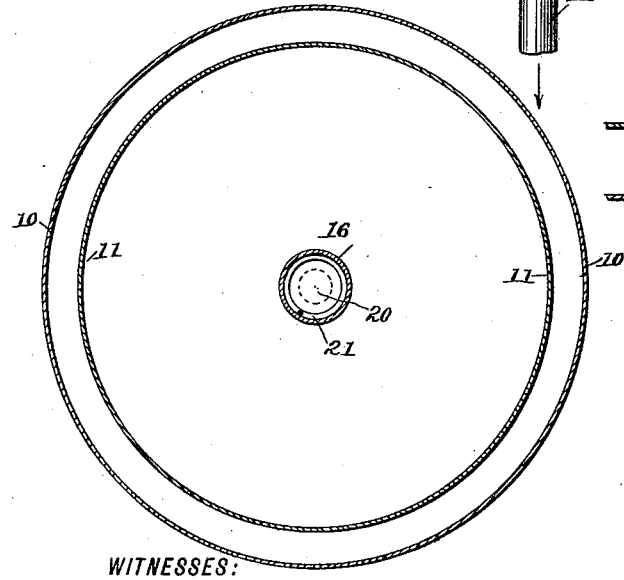
Figure 3:
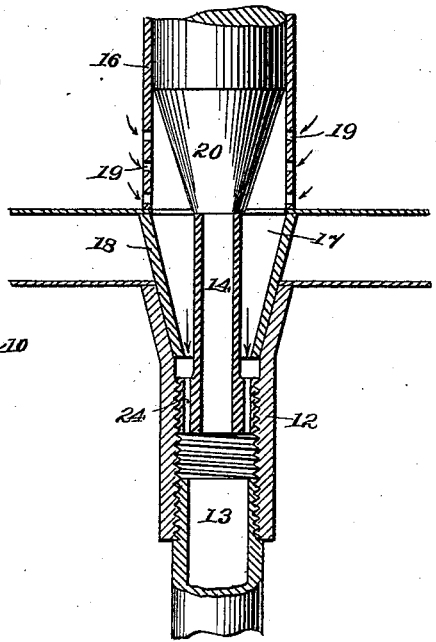

Figure 1 is a central vertical section through the tank. Fig. 2 is a section on line 2 2 of Fig. 1; and Fig. 3 is a partial vertical section through the tank, illustrating a slight modification.

The body of the tank consists of an outer shell or casing 10 and a storage-receptacle 11, loosely fitted in the said shell or casing. The shell or casing is open at the top, the sides and bottom being closed, and the storage-receptacle is closed at the top as well as at the sides and bottom.

In the bottom of the shell or casing 10, preferably at the center, an opening is made, and to the under face of the bottom, around said opening, the upper flaring end of a sleeve 12 is secured. The main portion of the sleeve 12 is round, the flaring portion being located at the top only to provide an inner conical surface, and the interior of the main circular portion of the sleeve is interiorly threaded, as illustrated in Fig. 1.

In the lower extremity of the sleeve 12 a feed-pipe 13, connecting with the stove, is secured, and a nipple 14 is screwed within the sleeve at the upper end, which nipple is largest at its lower extremity, or that portion attached to the sleeve. The said nipple is of sufficient length to project upward above the bottom of the shell or casing, and of such diameter that considerable space intervenes its outer surface and the inner conical surface of the sleeve. The upper end of the nipple is open, and in the sides of that portion of the nipple projected within the casing or shell a series of peripheral apertures 15 are produced.

The storage-receptacle is provided with a central tube 16, extending from top to bottom, and the bottom of the receptacle surrounded by the tube is cut away to create an aperture 17. To the under face of the bottom of the said storage-receptacle, around the said opening 17, a conical sleeve 18 is secured, the outer surface of which, when the storage-tank is in the shell, closely contacts with the inner conical surface of the lower shell-sleeve 12. A series of apertures 19 is produced in the tube 16 at its base, and within the said tube a conical valve 20 is held to slide. A spring 21 is made to bear upon the upper surface of the said valve, which spring has a bearing at its upper end against a disk 22, secured in the tube 19. Thus in operation, when the storage-receptacle 11 is removed to be refilled, the spring 21 forces the valve 20 down within the sleeve 18, which acts as a seat for said valve, and the contents of the storage-receptacle are effectually prevented from flowing off. After the storage-receptacle has been filled, which is accomplished by pouring the liquid through a capped opening 23, formed in the top, the receptacle is placed back in its shell or casing 10, and when placed in its shell or casing the valve 20 is brought in contact with the upper portion of the nipple 14, and as the sleeve 18 seats itself in the sleeve 12 the said valve is pushed upward within the tube 16 until the apertures 19 in said tube are uncovered, whereupon the contents of the storage-receptacle are free to flow through said apertures 19, down through the opening 17 in the bottom of the receptacle, and from thence through the apertures 15 of the nipple into the supply-pipe 13.

In Fig. 3 I have illustrated a slightly-modified form of the invention, in which it will be observed that, instead of producing diametrical apertures in the upper portion of the nipple 14, vertical apertures 24 are produced in the lower or enlarged portion of the nipple, whereby the flow of oil is rendered more direct, and the upper portion of the nipple simply serves as a trip for the valve 20.

Having thus described my invention, I claim as new and desire to secure by Letters Patent—

1. In a gasoline-tank, the combination, with a shell or casing provided with an aperture in its bottom surrounded by an integral threaded sleeve having a conical upper end, and a nipple secured within said sleeve and projected upward above the bottom of the casing, of a storage-tank loosely fitted in said casing, provided with an inclosed spring-actuated conical valve, an opening in the bottom beneath said valve surrounded by a conical sleeve, said valve being adapted for contact with the said nipple, and means, substantially as shown and described, for conducting the liquid from the receptacle into the nipple, as and for the purpose specified.

2. In a gasoline-tank, the combination, with a shell or casing having an opening formed in its bottom surrounded by an integral threaded sleeve provided with a conical flaring upper end, and an apertured nipple secured in said sleeve projecting above the bottom of the shell or casing, of a storage-receptacle loosely fitted in the shell, a tube provided with an opening in its bottom registering with the opening in the bottom of the shell, a tube surrounding the opening in the bottom of the receptacle, extending upward to the top thereof and provided with a series of apertures at its lower end, a conical sleeve surrounding the opening in the receptacle and adapted for contact with the interior conical surface of the shell-sleeve, and a spring-actuated valve held to slide in the tube of the receptacle, adapted for contact with the nipple and to be seated in the sleeve of the receptacle, as and for the purpose specified.

CHAS. A. RICE.

Witnesses:
M. H. PERRY,
CHAS. H. WESTACOTT.